United States Patent [19]
Dischert

[11] Patent Number: 6,040,869
[45] Date of Patent: Mar. 21, 2000

[54] METHOD AND APPARATUS FOR CONVERTING AN INTERLACE-SCAN VIDEO SIGNAL INTO A NON-INTERLACE-SCAN VIDEO SIGNAL

[75] Inventor: Lee Robert Dischert, Burlington, N.J.

[73] Assignee: Matsushita Electric Industrial Co. Ltd., Osaka, Japan

[21] Appl. No.: 09/052,771

[22] Filed: Mar. 31, 1998

[51] Int. Cl.[7] .............................. H04N 7/01; H04N 11/02
[52] U.S. Cl. ............................................ 348/448; 348/458
[58] Field of Search ................................... 348/448, 449, 348/450, 451, 452, 458, 443; H04N 7/01, 11/02

[56] References Cited

U.S. PATENT DOCUMENTS

| | | |
|---|---|---|
| 4,300,162 | 11/1981 | Robers . |
| 4,400,719 | 8/1983 | Powers . |
| 4,415,931 | 11/1983 | Dischert . |
| 4,550,336 | 10/1985 | Sepp . |
| 4,577,225 | 3/1986 | Pritchard . |
| 4,580,163 | 4/1986 | Hartmeier . |
| 4,583,113 | 4/1986 | Pritchard . |
| 4,639,763 | 1/1987 | Willis et al. . |
| 4,673,978 | 6/1987 | Dischert et al. . |
| 4,677,482 | 6/1987 | Lewis .................................... 348/448 |
| 4,679,084 | 7/1987 | Topper et al. ......................... 348/448 |
| 4,698,675 | 10/1987 | Casey .................................... 348/448 |
| 4,989,091 | 1/1991 | Lucas . |
| 5,329,314 | 7/1994 | Correa et al. . |
| 5,444,494 | 8/1995 | Yamamoto et al. ................... 348/448 |
| 5,517,247 | 5/1996 | Correa et al. . |

*Primary Examiner*—Michael H. Lee
*Attorney, Agent, or Firm*—Ratner & Prestia

[57] ABSTRACT

An interlace to progressive scan video signal conversion system interpolates lines between respective lines of upper and lower fields which constitute an interlace-scan image frame to produce lines of a progressive-scan image frame. The produced lines have effective spatial and temporal positions between the respective lines of the lower field and the lines of the upper field. One line from the upper field is interpolated with two lines from the lower field which are immediately above and immediately below the one line in the interlaced frame in order to generate two lines for the progressive frame. Optionally, the interlace-scan to progressive-scan method is applied only to relatively low-frequency components of the luminance signal with the higher frequency luminance signal components being selected from one of the two interlaced fields and either line-doubled or interpolated and line-doubled before being added to the progressive-scan low-frequency luminance signal components. The chrominance components of the interlace scan video signal from one field are line doubled, separated into color-difference signal components and applied to a matrix with the progressive-scan luminance signal components.

11 Claims, 9 Drawing Sheets

METHOD AND APPARATUS FOR CONVERTING AN INTERLACE-SCAN VIDEO SIGNAL INTO A NON-INTERLACE-SCAN VIDEO SIGNAL

FIELD OF THE INVENTION

This invention relates to television receivers and more particularly to television receivers which display interlace-scan video signal as non-interlaced or progressive-scan video images.

BACKGROUND OF THE INVENTION

Television signals formatted according to all of the major broadcasts standards are interlace-scan video signals. In an interlace-scan video signal, an image frame is displayed as two interleaved fields. One field, the upper field, contains the odd lines of the image frame while the other field, the lower field, contains the even lines of the image frame. Typically, the image fields occur at different times. For example, video signals formatted according to the NTSC standard have a field interval of 1/60 of a second between successive fields.

It has been known for some time that the display of interlace-scan video images produces artifacts in the displayed images. The most noticeable of these is a vertical dot crawl in which the image picture elements (pixels) which make up vertical lines in the displayed image appear be moving toward the top of the image.

It has also been known that distortion of this type may be removed if the interlace-scan image is displayed in a non-interlace format. One method of generating a non-interlace-scan image from a interlace-scan signal is to double each line of the interlace-scan signal or to interpolate between successive lines in a field in order to order to generate these image frames, tend to have artifacts such as jagged diagonal lines and horizontal lines which oscillate up and down from field to field. The systems which interpolate the intervening lines and image fields have alternating lines of different horizontal resolution, since the horizontal resolution of the interpolated lines is one-half the resolution of the non interpolated lines. Moreover, the relative position of the high resolution and low resolution image lines changes from frame to frame causing additional artifacts.

Other interlace-scan to progressive-scan conversion systems attempt to generate additional lines in one image field from the other image field which makes up the image frame. These systems use either an adaptive filter method or a linear filter method. The adaptive methods tend to be tricked by noise in the signal. This noise in the image signal may cause the adaptive filter to make the wrong decision, which may result in visible artifacts. Systems employing conventional linear filters have the problem of different frequency responses for pixels in the one image field versus pixels in the other image field or for interpolated versus non-interpolated pixels.

SUMMARY OF TH INVENTION

The present invention is embodied in an interlace-scan to progressive-scan conversion system which generates image frames that have a temporal position duo which is between the temporal positions of the two constituent image fields. The system interpolates image lines for the progressive frames by successively averaging a current line from a current field with the line in the previous field that is immediately above the current line and the line in the previous field which is immediately below the current line when the two fields are displayed.

According to one aspect of the invention, the interpolation method is applied only to relatively low-frequency components of the luminance signal information. Higher frequency luminance information is selected from one of the two constituent fields and displayed either by line doubling or after it has been processed by a weighted line interpolation filter.

According to another aspect of the invention, the low pass filtering used to separate the lower frequency luminance components from the composite video signal is part of the luminance/chrominance separation filter.

DETAILED DESCRIPTION

Under the standard developed by the National Television Standards Committee (NTSC), video signals are displayed as successive image frames, each frame including two interlaced image fields, an upper field and a lower field. An NTSC frame interval is 1/30 of a second and is divided into two field intervals of 1/60 of a second each. An image frame includes 525 horizontal line intervals divided such that 262 ½ horizontal lines occur in each image field.

Figure 2A:
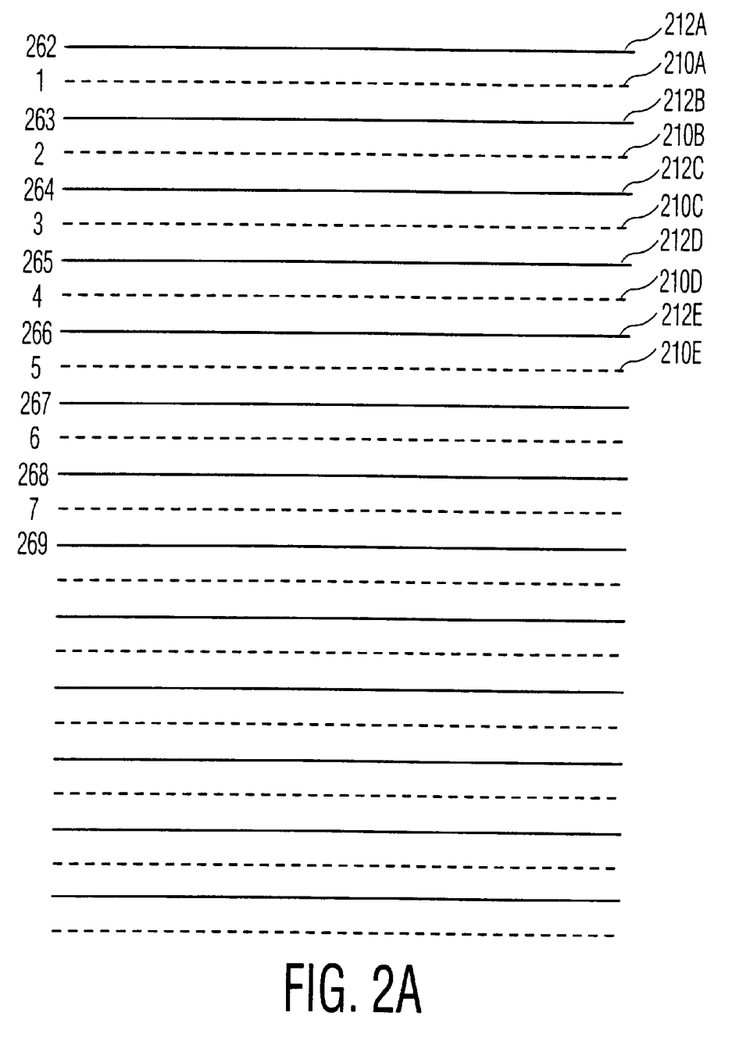
FIG. 2A is a video image diagram which illustrates the spatial relationship between two fields that constitute an image frame.

FIG. 2A is an image scan diagram which illustrates the relative spatial position of the two fields of an NTSC video frame. In the reproduced image, the lines 212 of the upper video field are scanned between respective lines 210 of the lower video field.

The exemplary embodiments of the invention described below, interpolate lines between respective lines of the two fields to produce lines of an image frame which occupy spatial positions between the lines 210 of the lower field and the lines 212 of the upper field. To generate four lines which are positioned between line 212A and line 212C, for example, line 210A is separately averaged with line 212A and line 212B and line 210B is separately averaged with lines 212B and line 212C. These operations produce interpolated lines of a non-interlaced image frame which have spatial and temporal positions between the lines of the image fields which are used to generate the frames.

Figure 1A:
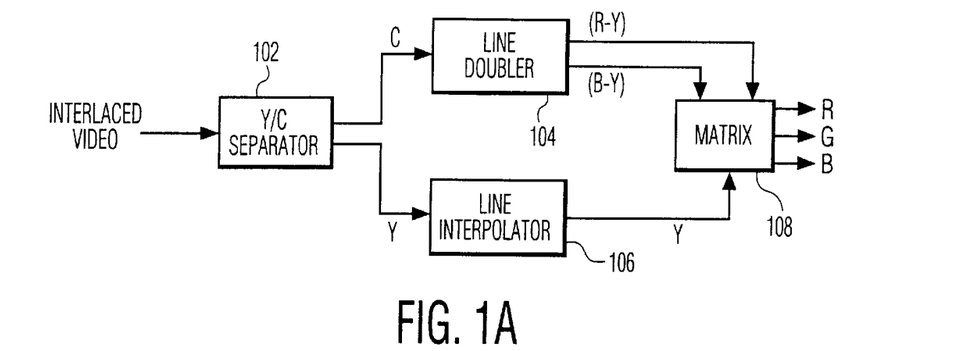
FIG. 1A is a block diagram of video signal processing circuitry which includes an embodiment of the invention.

FIG. 1A is a block diagram of signal processing circuitry which includes an embodiment of the present invention. In FIG. 1A, an interlaced video signal is received and applied to a luminance-chrominance separation circuit 102. The circuit 102 may include, for example, a line comb filter (not shown) which provides luminance and chrominance signals at a sample frequency, $4f_{sc}$, of four times the frequency of the color subcarrier signal. The chrominance signal is a sequence of samples (R-Y), (B-Y), -(R-Y), -(B-Y), (R-Y), ..., where (R-Y) and (B-Y) are color difference signals. The luminance signal provided by the circuit 102 has a bandwidth of approximately 4 MHz while the chrominance signal has a bandwidth of approximately 0.5 MHz.

The luminance signal provided by the luminance-chrominance separation circuit 102 is applied to a line interpolator 106 according to the present invention. An exemplary circuit suitable for use as the line interpolator 106 is described below with reference to FIG. 1B. As described below, the line interpolator provides luminance samples at a sample rate of $8f_{sc}$ and having twice the line frequency of the input interlaced video signal.

The chrominance signal provided by the circuit 102 is applied to a line doubler circuit 104. The circuit 104 doubles the chrominance samples for each line of the current field and separates the samples into separate (R-Y) and (B-Y) color difference signals. The line-doubled samples are provided at a sample rate of $8f_{sc}$, twice the line rate of the input interlaced video signal. The output signals Y, (R-Y) and (B-Y) provided by the line interpolator 106 and the line doubler 104 are applied to a matrix circuit 108 which combines the signals to produce primary color signals R, G and B which may be used to drive a display device (not shown).

Figure 1B:
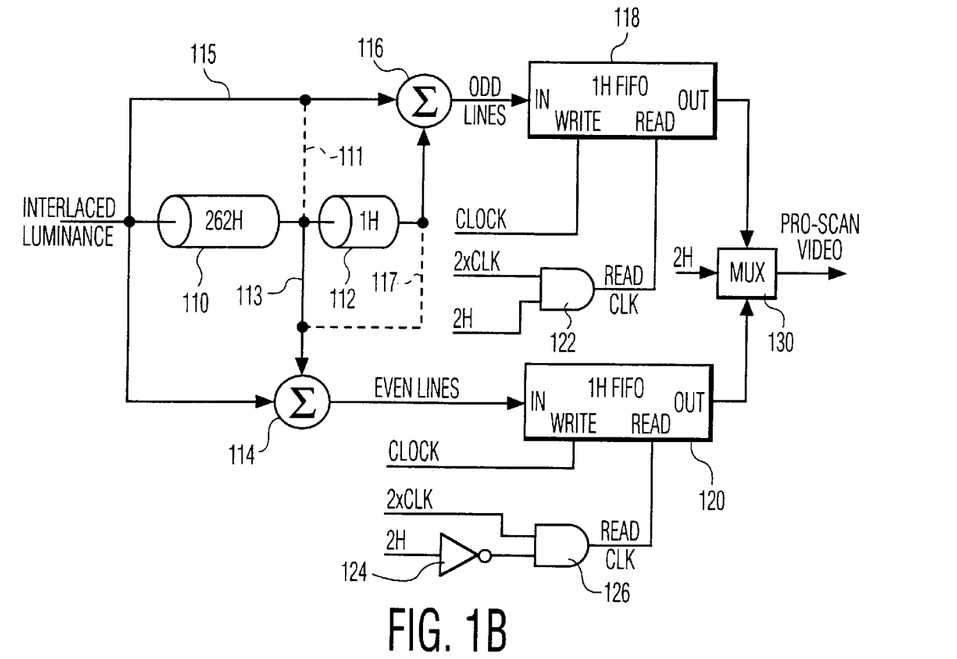
FIG. 1B is a block diagram of a video signal line interpolation circuit suitable for use in the circuitry shown in FIG. 1A.

FIG. 1B is a block diagram of line interpolation circuitry suitable for use as the line interpolator 106, shown in FIG. 1A. This circuit receives an interlace-scan luminance signal, such as that provided by the luminance/chrominance separation circuit 102, shown in FIG. 1A, and applies the signal to a 262H delay line 110. The current received interlaced luminance signal is summed with the signal delayed by 262 horizontal line intervals in the summing circuit 114. The output signal of the 262H delay line is also applied to the input terminal of a 1H delay line 112 to provide a signal delayed by 263 horizontal line intervals. The output signal of the delay line 112 is applied to one input port of a summing circuit 116. The other input port of the summing circuit 116 is coupled to receive the current interlaced luminance signal. The output signal of the summing circuit 114 is the current line summed with the line from the previous field that is immediately below the current line in the displayed image. Similarly, The output signal of the summing circuit 116 is the sum of the currently received line of luminance data and the line of luminance data from the previous field that is immediately above the current line in the displayed image.

The output signals of the summing circuits of 114 and 116 are applied to respective time compression circuits 120 and 118. Each of the circuits 120 and 118 is essentially a first-in-first-out (FIFO) memory having a sufficient number of cells to hold one horizontal line interval of samples. In the exemplary embodiment of the invention, each of the FIFO memories holds at least 910 pixel data values. Data value are stored into the memories 120 and 118 as they are produced by the summing circuits 114 and 116 at the interlace-scan sample rate (e.g. $4f_{sc}$) and then are alternately read out of the memories 120 and 118 at twice the input sample rate (e.g. $8f_{sc}$). Thus, the output signal of the circuitry shown in FIG. 1 has twice as many video lines as the input signal, each video line having the same number of samples as a line of the input signal. Thus, the output signal of the circuit shown in FIG. 1 is a non-interlaced video signal each line of each frame of the non-interlaced video signal containing video information from two fields of the input interlaced video signal.

Figure 1C:
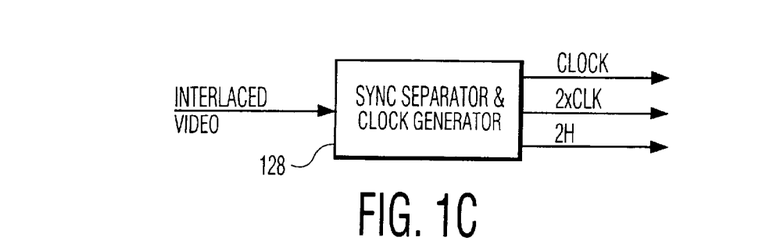
FIG. 1C is a block diagram of clock signal generation circuitry suitable for use with the video signal processing circuitry shown in FIGS. 1A and 1B.

The clock signals that control the time compression circuits 118 and 120 are generated by the sync separator and clock generator 128 shown in FIG. 1C. This circuit receives the interlaced video signal and generates from this signal a pixel clock signal, CLOCK, a frequency doubled signal, 2×CLK which has a frequency that is twice the frequency of the pixel clock signal and a signal, 2H, which has a frequency of twice the line frequency of the input interlaced video signal and which changes state each half line of the input video signal. The sync separator and clock generator 128 may include, for example, a sync separator circuit which separates the horizontal synchronization pulses and the color burst signal from the interlaced video signal and two phase locked loops, one which is synchronized to the horizontal sync pulses to generate the signal 2H and one which is synchronized to the color burst signal to produce the signals CLOCK and 2×CLK. In the exemplary embodiment of the invention, the signal CLOCK has a frequency of 4 times the color subcarrier frequency ($4f_{sc}$) of the input interlaced NTSC video signal and the signal 2×CLK has a frequency of $8f_{sc}$.

The signal CLOCK is applied to the write clock input of the 1H (FIFO) memories 120 and 118. Responsive to this signal, data provided by the summing circuits 114 and 116 is stored into the FIFO memories on a pixel by pixel basis as it is generated. The read clock signals for the FIFO memory 120 are generated by an inverter 124 and AND gate 126. The inverter 124 inverts the signal 2H provided by the circuitry 128 and applies it to one input port of the AND gate 126. The other input terminal of the AND gate 126 is coupled to receive the signal 2×CLK. The AND gate 126 provides clock signals at twice the input pixel rate but for only one half line interval. Thus, one line of data from the summing circuit 114 is read out of the 1H FIFO memory 120 in one half horizontal line interval.

The read clock signal for the 1H FIFO 118 is generated by an AND gate 122 which is coupled to receive the signal 2×and the 2H signal. The output signal of this AND gate provides clock pulses at the 2×CLK rate for every sample of input video data in the line but in the opposite half of the input horizontal line interval from the circuit 126.

In operation, input data is provided to the 1H FIFO 118 for one-half of one line interval. When the one-half line interval point is reached, data is read out of the FIFO 118 for one-half line interval but at twice the rate at which it was written into the FIFO. Thus, an entire video line of data is read out of the FIFO 18 in one-half line interval. For FIFO 120, an entire line of data is written into the FIFO and is then read out of the FIFO in one-half line interval. The first pulse of the write clock signal which writes a new line of data into the FIFO 120 is synchronized to occur immediately after the first clock pulse of the read clock signal which reads data out of the FIFO 120.

When data is provided by the FIFO 118, the multiplexer 130 is conditioned, by the signal 2H, to pass that data as the progressive-scan video signal. When data is provided by the FIFO 120, however, the multiplexer 130 is conditioned to provide that data as the progressive-scan video signal.

While the timing described above for the FIFO memories 118 and 120 is theoretically possible, actual FIFO memory devices may need more than 1H memory (e.g. 910 memory locations) in order to implement the time compression function described above.

As an alternative to the embodiment shown in FIG. 1B, it is contemplated that the positions of the 262H delay line 110 and the 1H delay line 112 may be switched, the connections 115 and 113 broken (as indicated by the X's), and the connections 117 and 111 (shown in phantom) added in their place. In this alternative embodiment, the line from the delayed field is added to the lines immediately above and below it in the current field. Using the notation of FIG. 2A, line 212B is simultaneously and separately interpolated with lines 210A and 210B in order to generate the two output lines of the progressive scan video signal.

Figure 2B:
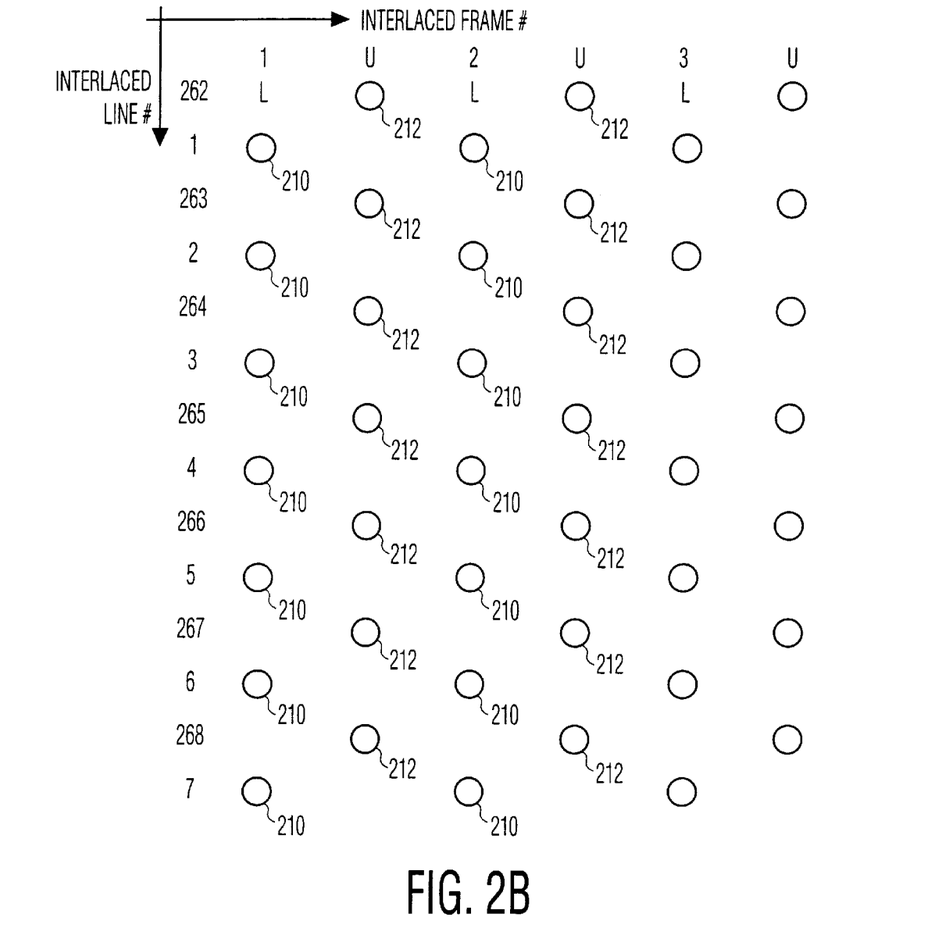
FIG. 2B is a vertical-temporal diagram which shows several lines of several video image fields and is useful for describing the environment in which the invention operates.

FIG. 2B is a vertical temporal diagram which shows several interlaced frames, numbered 1, 2, and 3. Each frame including a lower field "L" and upper field "U". The columns of circles in FIG. 2B represent individual lines of the video fields. As shown in FIG. 2B, the lines 210 of the lower field are positioned between the lines 212 of the upper field in the displayed image. The vertical temporal diagram shown in FIG. 2B may be considered to be the image scan diagram shown in FIG. 2A rotated out of the page such that the image lines go into the page.

Figure 2C:
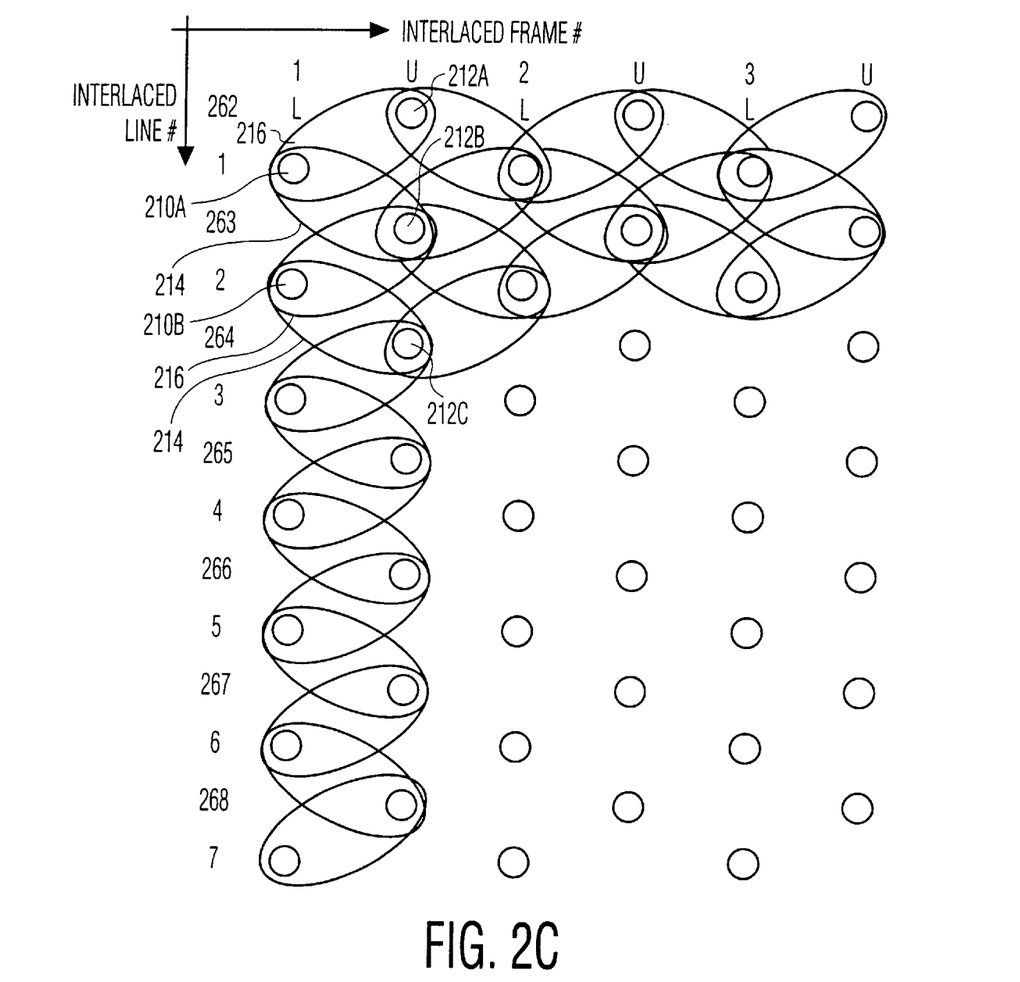
FIG. 2C is a vertical-temporal diagram of several lines of several image fields which is useful for describing the operation of the circuitry as shown in FIG. 1B.

FIG. 2C illustrates the operation of the circuitry shown in FIG. 1B. Each of the ellipses 214 and 216 shown in FIG. 2C represents an interpolation operation performed by one of the summing circuits 116 and 114 shown in FIG. 1B.

For example, the ellipse 216 represents the summing of current interlaced video signal line 210A with delayed video signal line 212A by the summing circuit 116. Similarly, the ellipse 214 represents the summing of the current interlaced video signal line 210A and the delayed interlaced video signal line 212B.

Figure 2D:
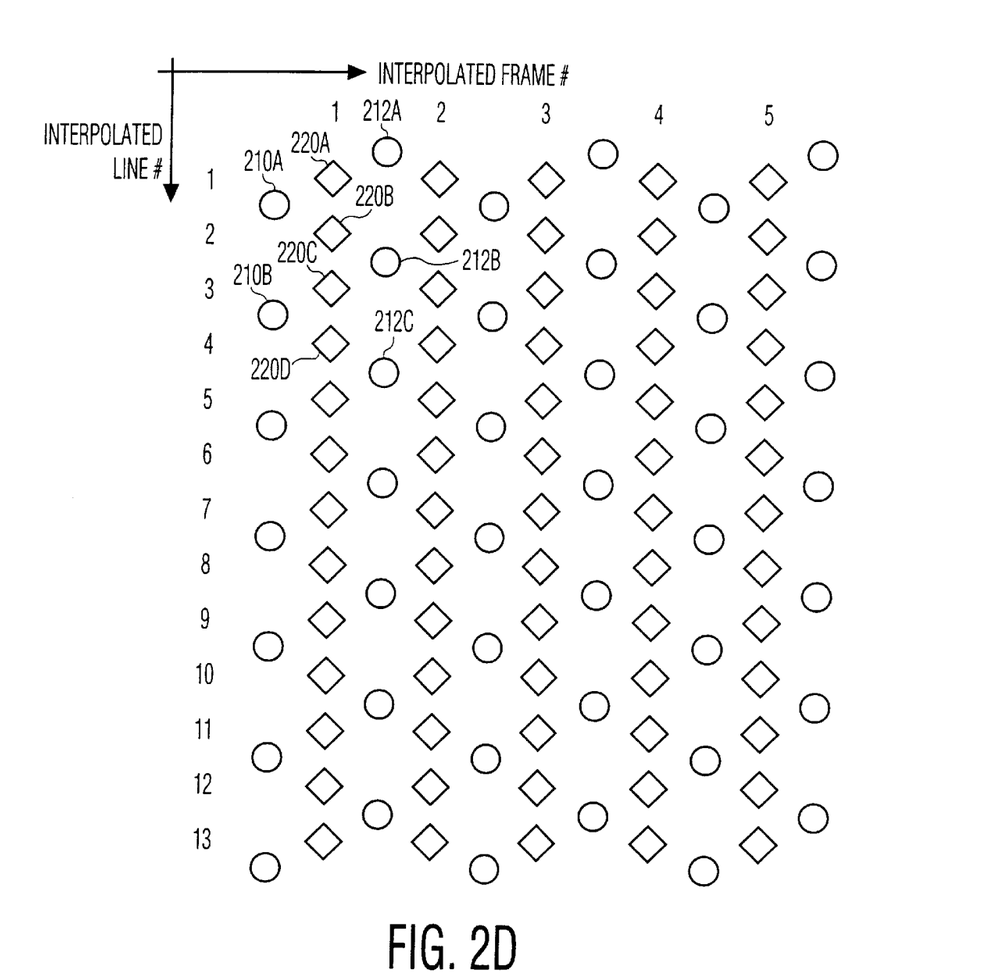
FIG. 2D is a vertical-temporal diagram of several lines of several fields of an interlaced signal superimposed upon the resulting non-interlaced lines of several frames produced using the circuitry shown in FIG. 1B.
Figure 2E:
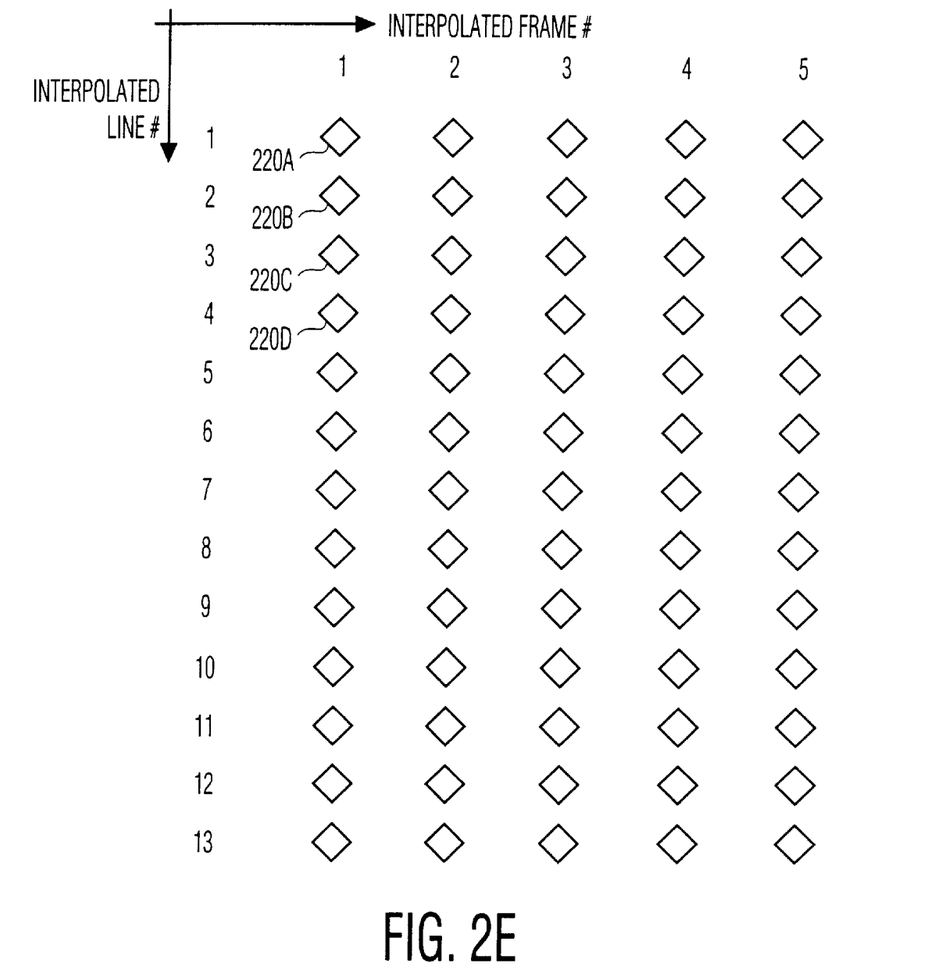
FIG. 2E is a vertical-temporal diagram showing several lines of several non-interlaced frames produced by the circuitry shown in FIG. 1B.

Because the temporal position of the two input lines to the interpolation circuitry shown in FIG. 1B are separated by a field time interval, the temporal position of the resulting interpolated line lies in the center of that field time interval. This is illustrated in FIG. 2D. In FIG. 2D, the interpolated frames are shown as columns of diamonds between the columns of circles that represent the fields of the input image. As shown in FIG. 2D, interpolated line 220A is generated from original lines 210A and 212A. Interpolated line 220B is generated from input interlaced line 210A and 212B. Interpolated lines 220C and 220D are generated in the same way from interpolated input lines 210B and 212B and 210B, and 212C, respectively FIG. 2E shows the interpolated lines of the output non-interlaced frames with the input interlaced lines removed.

Figure 3:
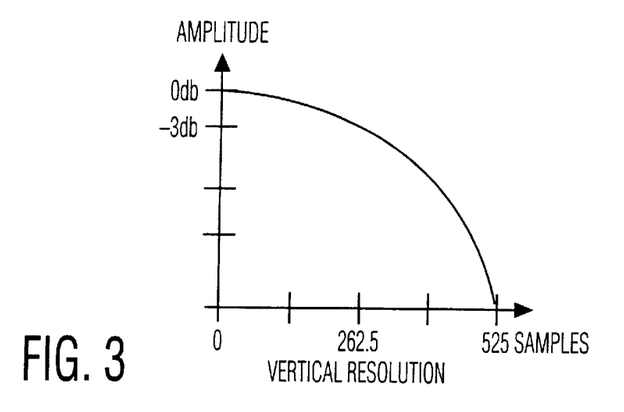
FIG. 3 is a graph of vertical sample number versus amplitude for the non-interlaced video signal shown in FIG. 2D.
Figure 4:
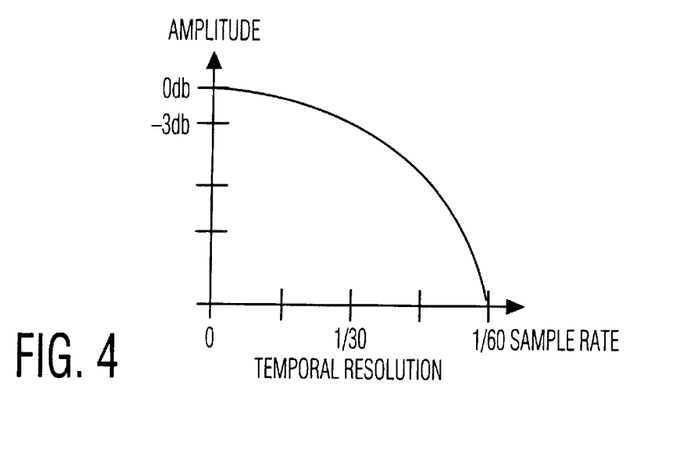
FIG. 4 is a graph of sample rate versus amplitude for the non-interlaced video signal shown in FIG. 2D.

FIG. 3 is a graph showing the vertical resolution of the output non-interlaced video signal. The characteristic shown in FIG. 3 represents a low pass vertical filtering of the input video image. FIG. 4 is a graph of amplitude versus sample rate which illustrates the temporal resolution of the signal provided by the circuitry shown in FIG. 1B. This Figure shows that there is a reduction in temporal resolution of the interlaced video signal by the interpolation process which produces the non-interlaced video signal.

Figure 5:
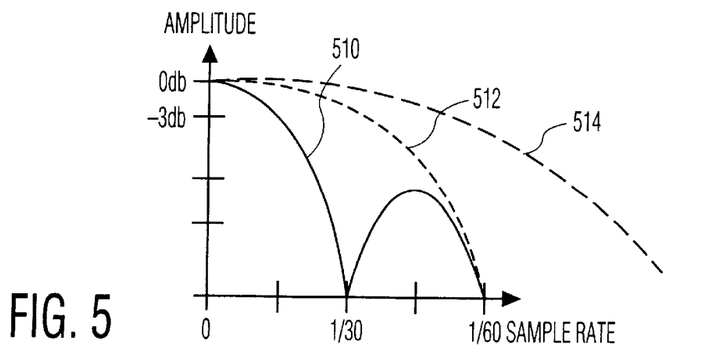
FIG. 5 is a graph of sample rate versus amplitude which is useful for describing the relationship between the filtering provided by a video camera and the embodiment of the invention shown in FIG. 1B.

The reduction in temporal resolution by the circuitry shown in FIG. 1B, however, is comparable to the temporal resolution of a signal produced by a standard CCD television camera. Curve 512 in FIG. 5 illustrates the temporal resolution of a field rate video CCD camera. The roll off shown in this characteristic is the result of integration of pixel data in the CCD camera over one field interval. Curve 510 of FIG. 5 similarly shows the temporal response of a frame integrated video CCD camera. As shown, the temporal resolution of signals provided by a frame integrated camera is considerably less than that provided by field integrated video cameras. Finally, FIG. 514 shows the temporal response characteristic of a shuttered CCD camera. Shuttered cameras integrate light quickly and for a shorter time interval than either a frame interval or a field interval and thus, have a higher temporal resolution than either frame integrated or field integrated cameras.

From the graph shown in FIG. 5, it is apparent that the circuitry shown in FIG. 1B would have a negligible effect on the temporal resolution of a video signal produced by a frame integrated or field integrated camera however it may have a greater effect on a shuttered camera.

The circuitry shown in FIG. 1B operates on a comb-filtered luminance signal generated by the luminance/chrominance separation filter 102 of FIG. 1A. While this circuitry produces good results for most images, for some images there may be blurring along the horizontal lines of the image or even double images where there is movement between the two fields of a video signal. These artifacts are caused by the inclusion of high-frequency horizontal video information in the interpolated non-interlace-scan video signal and by horizontal motion in the image between the two fields that constitute the image frame. When this motion occurs, the pixels of the two fields that are being averaged to produce a pixel of non-interlaced frame may not represent the same video information. When the image includes a weak vertical edge, a blurring of the edge may result. When the image includes a strong vertical edge, it may contribute to pixels at different points on the line, resulting in an apparent double edge in the video image.

Figure 6:
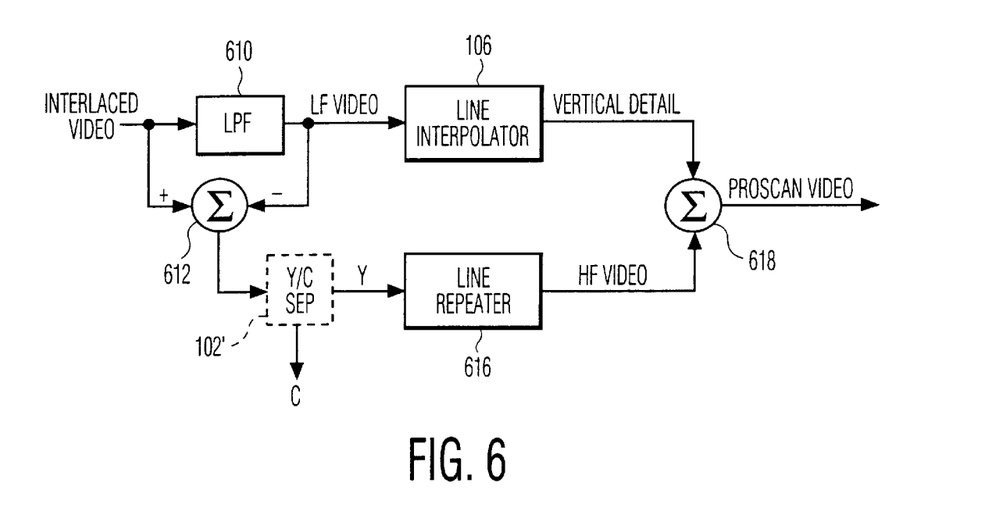
FIG. 6 is a block diagram of video signal processing circuitry according to an alternative embodiment of the invention which includes a line interpolator such as that shown in FIG. 1B.

The circuitry shown in FIG. 6 is designed to mitigate these blurring or double line artifacts. Essentially, this circuitry applies the line interpolation only to the low horizontal frequency components of the video image and augments these interpolated lines with high frequency video information taken from only one of the component fields. The circuitry shown in FIG. 6 may receive either the interlaced luminance signal provided by the luminance/chrominance separation circuitry 102 shown in FIG. 1A or it may receive an interlaced composite video signal, including both luminance and chrominance components.

In FIG. 6, the interlaced input signal is applied to a low pass filter 610 and to one input port of a subtracting circuit 612. The other input port of the subtracting circuit 612 is coupled to receive the output signal of the low pass filter 610. The output signal of the low pass filter 610 is also applied to the line interpolation circuitry 106 which may be the same as that shown in FIG. 1B. The output signal of the subtracting circuit 612, thus, represents only the high horizontal frequency components of the interlaced video signal.

If the input signal to the circuitry shown in FIG. 6 is a composite video signal, the signal provided by the subtracting circuit 612 is applied to an optional luminance/chrominance separation circuit 102' (shown in phantom) which separates the chrominance signal components from the high frequency luminance signal components and provides the luminance signal components to a line repeater circuit 616. In this alternative embodiment of the invention, the separated chrominance signal is applied to the line doubling circuitry 104 shown in FIG. 1A.

If, however, the input signal to the circuitry shown in FIG. 6 is the comb-filtered luminance signal provided by the luminance/chrominance separation circuit 102 shown in FIG. 1A, then the circuit 102' is not needed and the high-frequency luminance signal is applied to the line repeater circuit 616 directly from the subtracting circuit 612.

The exemplary line repeater circuit 616 operates in the same way as the line doubling circuit 104, described above, to produce non-interlaced lines of video samples in which the horizontal high frequency information from each line in the current input video field occurs twice, on adjacent lines, in the output video frame. The line repeater circuit 616 applies these high frequency components to all lines of the non-interlaced signal provided by the line interpolator 614, by summing the corresponding samples of non-interlaced signal and the high frequency video information in a summing circuit 618.

Figure 7:
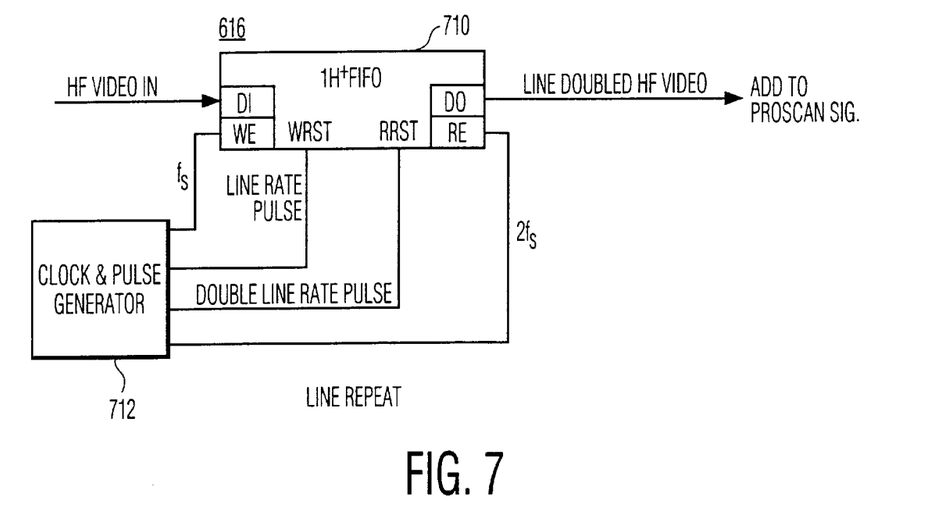
FIG. 7 is a block diagram of a line repeat circuit suitable for use in the circuitry shown in FIG. 6.

FIG. 7 is a block diagram of a line repeat circuit suitable for use in the circuitry shown in FIG. 6. In FIG. 7, the input signal is applied to a 1H FIFO memory 710 which also receives signals provided by a clock and pulse generator 712. These signals include an input clock signal, $f_s$, at the input sample rate and an output clock signal, $2f_s$ at twice the input sample rate. The address counter for the input FIFO 710 is reset by a line rate pulse. And the output address counter for the FIFO 710 is reset by a pulse having double the frequency of the line rate pulse. In operation, when one-half of the input line has been written into the FIFO, the double line rate pulse resets the output counter and the stored line of data is read out at twice the rate at which it was written in. One-half line interval after the occurrence of the read reset pulse, the data stored in the FIFO 710 has been read out for the first time and the read clock is again reset to read the data out a second time, during the next one-half line interval. Shortly after the read clock is reset, the write clock is reset causing a new line of data to begin to be stored into the cells of the FIFO memory 710 that were just read responsive to the read clock signal. As set forth above with reference to the FIFO memories 118 and 120 shown in FIG. 1, in a practical implementation, the FIFO memory 710 may need some additional cells beyond the 1H number of cells in order to operate properly.

Figure 8:
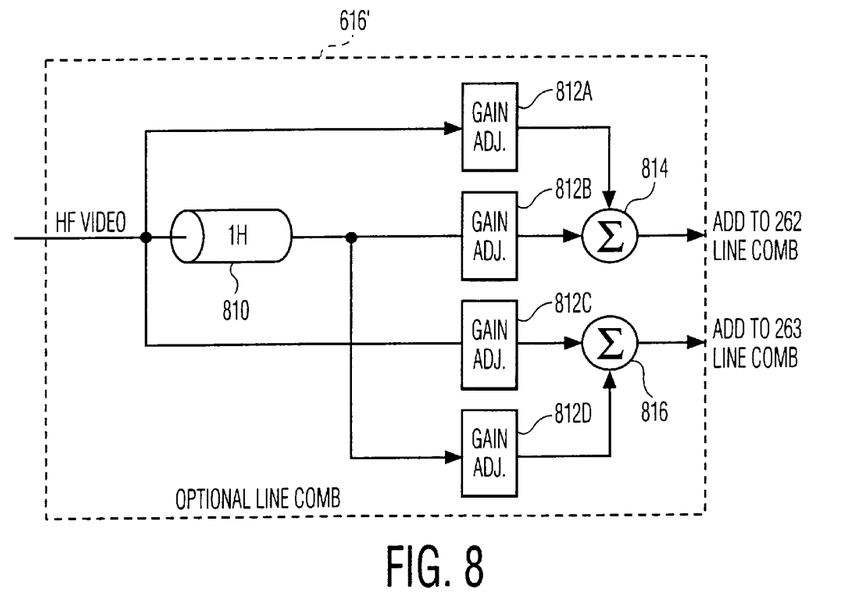
FIG. 8 is a block diagram of a line comb filter suitable for use in place of the line repeat circuit shown in FIG. 6.

The circuitry shown in FIG. 7 simply doubles the lines from one field and applies them to the respective lines of the interpolated frame. This, however, may result in diagonal artifacts in the non-interlaced image. An alternative scheme to the line repeat scheme shown in FIG. 7, is the line interpolation filter shown in FIG. 8. This circuit receives the high frequency luminance information into a 1H delay line 810 and also applies the high frequency information to gain adjust circuits 612A and 612C. The output signal of the 1H delay line is applied to gain adjust circuits 812B and 812D. The output signals provided by gain adjusted circuits 812A and 812D are applied to a summing circuit 814 which produces a signal that is, in turn, summed with the output signal provided by the summing circuit 114 shown in FIG. 1B. The output signals of gain adjust circuits 812C and 812D are applied to a summing circuit 816 which produces an output signal that is added to the output signal provided by the summing circuit 116 shown in FIG. 1B. By setting the gain adjust circuits 812A and 812B to, for example, 0.25 and 0.75 respectively and the gain circuits 812C and 812D to 0.75 and 0.25 respectively, vertical phase information that would otherwise be lost by the line repeat circuitry may be partially regained through interpolation.

While the invention has been described in terms of an NTSC video signal processing circuit, it is contemplated that it may be used to convert any interlace scan video signal to a non-interlace or progressive scan video signal. One skilled in the art of designing video signal processing circuits could readily construct such circuitry given the above description of the invention.

While the invention has been described in terms of exemplary embodiments, it is contemplated that it may be practiced as outlined above within the scope of the appended claims.

What is claimed:

1. An interlace-scan to progressive-scan video signal conversion system comprising:
    a terminal for receiving the interlace-scan video signal;
    a first delay element, coupled to the terminal for delaying the interlace-scan video signal by a number, N, of horizontal line intervals to produce a first delayed video signal, wherein N horizontal line intervals is less than one field period but N+1 horizontal line intervals is greater than one field period;
    a second delay element, coupled to the first delay element for delaying the first delayed video signal by one horizontal line interval to produce a second delayed video signal;
    a first interpolator which combines the received interlace-scan video signal with the first delayed video signal to produce a first interpolated signal;
    a second interpolator which combines the received interlace-scan video signal with the second delayed video signal to produce a second interpolated signal;
    a first speed-up memory coupled to the first interpolator to receive samples of the first interpolated signal at a first sample rate and to provide the samples of the first interpolated signal, as an output signal, at a second sample rate which is twice the first sample rate;
    a second speed-up memory coupled to the second interpolator to receive samples of the second interpolated signal at the first sample rate and to provide the samples of the second interpolated signal, as an output signal, at the second sample rate; and
    a multiplexer, coupled to the first and second speedup memories, to alternately provide the output signals of the first and second speedup memories as a progressive-scan video signal.

2. An interlace-scan to progressive-scan video signal conversion system according to claim 1, further comprising:
    a low-pass filter which attenuates relatively high frequency components of the interlace scan video signal relative to relatively low frequency components to provide a low-pass filtered interlace-scan video signal, wherein the first and second delay elements and the first and second interpolators are coupled to receive the low-pass filtered interlace-scan video signal;

a subtracter which subtracts the low-pass filtered interlace-scan video signal from the received interlace-scan video signal to provide a high-pass filtered interlace scan video signal;

a line doubling memory, coupled to receive the high-pass filtered interlace scan video signal for generating a progressive-scan high-pass filtered video signal; and means for adding the progressive-scan high-pass filtered video signal to the signal provided by the multiplexer to produce the progressive scan video signal.

3. An interlace-scan to progressive-scan video signal conversion system according to claim 1, further comprising:

a low-pass filter which attenuates relatively high frequency components of the interlace scan video signal relative to relatively low frequency components to provide a low-pass filtered interlace-scan video signal, wherein the first and second delay elements and the first and second interpolators are coupled to receive the low-pass filtered interlace-scan video signal;

a subtracter which subtracts the low-pass filtered interlace-scan video signal from the received interlace-scan video signal to provide a high-pass filtered interlace scan video signal;

a third delay element which delays the high-pass filtered interlace scan video signal by one horizontal line interval of the interlace-scan video signal to produce a delayed high-pass filtered video signal;

a third interpolator which combines the high-pass filtered interlace scan video signal and the delayed high-pass filtered video signal in a first proportion to produce a first interpolated high-pass filtered video signal;

a fourth interpolator which combines the high-pass filtered interlace scan video signal and the delayed high-pass filtered video signal in a second proportion, different from the first proportion, to produce a second interpolated high-pass filtered video signal;

means for adding the first interpolated high-pass filtered video signal to the first interpolated signal; and means for adding the second interpolated high-pass filtered video signal to the second interpolated signal.

4. An interlace scan to progressive scan video signal conversion system according to claim 3, wherein the received interlace scan video signal is a composite video signal including luminance signal components and chrominance signal components and the system further comprises luminance/chrominance separation circuitry, coupled to receive the high-pass filtered interlace-scan video signal, which separates the chrominance signal components from the high-pass filtered interlace-scan video signal before providing the high-pass filtered interlace-scan video signal to the third delay element and to the third and fourth interpolators.

5. An interlace-scan to progressive-scan video signal conversion system according to claim 1, wherein the received interlace-scan video signal is a luminance component signal.

6. An interlace-scan to progressive-scan video signal conversion system comprising:

a terminal for receiving an interlace-scan luminance video signal;

a first delay element, coupled to the terminal for delaying the interlace-scan luminance video signal by 262 horizontal line intervals;

a second delay element, coupled to the first delay element for delaying the first delayed video signal by one horizontal line interval to produce a second delayed video signal;

a first interpolator which combines the received interlace-scan luminance video signal with the first delayed video signal to produce a first interpolated signal;

a second interpolator which combines the received interlace-scan luminance video signal with the second delayed video signal to produce a second interpolated signal;

a first speed-up memory coupled to the first interpolator to receive samples of the first interpolated signal at a first sample rate and to provide the samples of the first interpolated signal, as an output signal, at a second sample rate which is twice the first sample rate;

a second speed-up memory coupled to the second interpolator to receive samples of the second interpolated signal at the first sample rate and to provide the samples of the second interpolated signal, as an output signal, at the second sample rate; and a multiplexer, coupled to the first and second speedup memories, to alternately provide the output signal of the respective first and second speedup memories as a progressive-scan video signal.

7. A method for converting an interlace-scan video signal having a first sample rate to a progressive-scan video signal having a second sample rate greater than the first sample rate, the method comprising the steps of:

a) providing video signal representing the interlace scan video signal;

b) providing a second video signal representing the interlace scan video signal, the first and second video signals having a difference in time of N horizontal line intervals, N being an integer such that N horizontal line intervals is less than one field period but N+1 horizontal line intervals is greater than one field period;

c) providing a third video signal representing the interlace scan video signal, the first and third video signals having a difference in time of N+1 horizontal line intervals;

d) interpolating between the first and second video signals to produce a first interpolated signal;

e) interpolating between the first and third video signals to produce a second interpolated signal;

f) doubling the sample rate of the first and second interpolated signals to produce double-speed first and second interpolated signals;

g) alternately providing one horizontal line of samples of the double-speed first and second interpolated signals, respectively, as a progressive-scan video signal.

8. A method according to claim 7, further comprising the steps of:

low-pass filtering the interlace scan video signal to provide a low-pass filtered interlace-scan video signal, as the interlace-scan video signal that is processed in steps a), b), and c);

subtracting the low-pass filtered interlace-scan video signal from the interlace-scan video signal to provide a high-pass filtered interlace scan video signal;

converting each line of samples of the high-pass filtered interlace-scan video signal into two lines of samples at the second sampling rate to produce a progressive scan high-pass filtered video signal; and adding the progressive-scan high-pass filtered video signal to the signal provided by step g) to produce the progressive scan video signal.

9. A method according to claim 7, further comprising the steps of:

low-pass filtering the interlace scan video signal to provide a low-pass filtered interlace-scan video signal, as the interlace-scan video signal that is processed in steps a), b), and c);

subtracting the low-pass filtered interlace-scan video signal from the interlace-scan video signal to provide a high-pass filtered interlace scan video signal;

delaying the high-pass filtered interlace scan video signal by one horizontal line interval of the interlace-scan video signal to produce a delayed high-pass filtered video signal;

interpolating between the high-pass filtered interlace scan video signal and the delayed high-pass filtered video signal in a first proportion to produce a first interpolated high-pass filtered video signal;

interpolating between the high-pass filtered interlace scan video signal and the delayed high-pass filtered video signal in a second proportion, different from the first proportion, to produce a second interpolated high-pass filtered video signal;

adding the first interpolated high-pass filtered video signal to the first interpolated signal; and adding the second interpolated high-pass filtered video signal to the second interpolated signal.

10. A method according to claim 9, wherein the received interlace scan video signal is a composite video signal including luminance signal components and chrominance signal components and the method further comprises the step of separating the chrominance signal components from the high-pass filtered interlaces scan video signal before delaying the high-pass filtered interlace-scan video signal and before interpolating between the high-pass filtered interlace-scan video signal and the delayed high-pass filtered video signal.

11. Apparatus for converting an interlace-scan video signal having a first sample rate to a progressive-scan video signal having a second sample rate greater than the first sample rate, the method comprising:

means for providing video signal representing the interlace scan video signal;

means for providing a second video signal representing the interlace scan video signal, the first and second video signals having a difference in time of N horizontal line intervals, N being an integer such that N horizontal line intervals is less than one field period but N+1 horizontal line intervals is greater than one field period;

means for providing a third video signal representing the interlace scan video signal, the first and third video signals having a difference in time of N+1 horizontal line intervals;

means for interpolating between the first and second video signals to produce a first interpolated signal;

means for interpolating between the first and third video signals to produce a second interpolated signal;

means for doubling the sample rate of the first and second interpolated signals to produce double-speed first and second interpolated signals;

means for alternately providing one horizontal line of samples of the double-speed first and second interpolated signals, respectively, as a progressive-scan video signal.

* * * * *